US011436608B1

(12) United States Patent
Mazzochi et al.

(10) Patent No.: US 11,436,608 B1
(45) Date of Patent: *Sep. 6, 2022

(54) COMMERCIAL CREDIT CARD SYSTEM

(71) Applicant: Wells Fargo Bank, N.A., San Francisco, CA (US)

(72) Inventors: Mary Mazzochi, Chandler, AZ (US); Mark Ellefson, San Francisco, CA (US); Marc Bacon, San Francisco, CA (US); Barney Spann, San Francisco, CA (US); Christine N. Hunsucker, Loveland, CO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/945,419

(22) Filed: Jul. 31, 2020

Related U.S. Application Data

(63) Continuation of application No. 15/002,541, filed on Jan. 21, 2016, now Pat. No. 10,733,612.

(51) Int. Cl.
*G06Q 20/40* (2012.01)
*G06Q 20/24* (2012.01)

(52) U.S. Cl.
CPC .......... *G06Q 20/409* (2013.01); *G06Q 20/24* (2013.01)

(58) Field of Classification Search
CPC .................................................. G06Q 20/409
USPC ......................................................... 705/44
See application file for complete search history.

(56) References Cited

U.S. PATENT DOCUMENTS 6,032,136 A * 2/2000 Brake, Jr. ............ G06Q 20/341
705/14.1
6,332,126 B1   12/2001 Peirce et al.
6,516,302 B1 * 2/2003 Deaton ............... G06Q 30/0239
705/14.38

(Continued)

OTHER PUBLICATIONS

"Credit Card Fraud Detection using Hidden Markov Model" (Year: 2008).*

(Continued)

*Primary Examiner* — Bruce I Ebersman
(74) *Attorney, Agent, or Firm* — Shumaker & Sieffert, P.A.

(57) ABSTRACT

One or more interfaces receive, from one or more sources, supplier data, comprising transactional data and an industry type, and supplier profile data, comprising supplier acceptance category information, associating each of a plurality of predetermined supplier acceptance categories with one or more industry types, and profile type information, associating each of a plurality of predetermined profile types with one or more transaction characteristics of a plurality of transaction characteristics and one or more supplier acceptance categories of the plurality of predetermined supplier acceptance categories. One or more processors determine: a transaction characteristic associated with the transactions based on the transactional data; a supplier acceptance category associated with the supplier based on the industry type and the supplier acceptance category information; and a profile type associated with the supplier based on the transaction characteristic, the supplier acceptance category, and the profile type information; and output the profile type.

16 Claims, 5 Drawing Sheets

(56) References Cited

U.S. PATENT DOCUMENTS

| | | | |
|---|---|---|---|
| 7,069,244 | B2 | 6/2006 | Strayer et al. |
| 9,665,885 | B1 | 5/2017 | Allouche |
| 9,679,299 | B2 | 6/2017 | Yoder et al. |
| 10,339,528 | B2 * | 7/2019 | Murphy ............... G06Q 20/405 |
| 10,467,612 | B2 * | 11/2019 | Murphy ................. G06Q 20/20 |
| 10,733,612 | B1 * | 8/2020 | Mazzochi ........... G06Q 20/409 |
| 10,817,896 | B2 * | 10/2020 | Winner ............. G06Q 30/0246 |
| 10,902,454 | B2 * | 1/2021 | Chakrobartty ..... G06Q 30/0238 |
| 2004/0054622 | A1 * | 3/2004 | Strayer ............... G06Q 20/204 705/40 |
| 2006/0053056 | A1 * | 3/2006 | Alspach-Goss ........ G06Q 30/06 705/14.27 |
| 2011/0295722 | A1 * | 12/2011 | Reisman ............ G06Q 30/0641 705/26.1 |
| 2012/0066065 | A1 | 3/2012 | Switzer |
| 2012/0290379 | A1 | 11/2012 | Hoke et al. |
| 2012/0290400 | A1 * | 11/2012 | Hoke ..................... G06Q 30/04 705/14.66 |
| 2013/0218670 | A1 | 8/2013 | Spears et al. |
| 2014/0249878 | A1 * | 9/2014 | Kaufman ........... G06Q 10/1095 705/7.19 |
| 2015/0186908 | A1 * | 7/2015 | Taskin ............... G06Q 30/0204 705/7.33 |
| 2016/0343072 | A1 * | 11/2016 | Mohnot ......... G06Q 10/063112 |
| 2017/0098203 | A1 * | 4/2017 | Rolfson ............... G06Q 20/102 |

OTHER PUBLICATIONS

"Successful product characteristics for electronic commerce: a taxonomy of transaction types" (Year: 1997).*
Kauman, Rebecca, "Acceptance Matters, and Now we Know by How Much", Jan. 28, 2013, 16 pages.
Prosecution History from U.S. Appl. No. 15/002,541, dated Oct. 18, 2018 through Jun. 23, 2020, 162 pp.

* cited by examiner

Customized A/P Program

202 — This report provides a breakdown of how Financial Institution ABC will work to achieve the goal of A/P program automation. By defining which suppliers will be pursued and in what manner they will be paid, our analytical system calculates forecasted outcomes based on interactions with suppliers in the same position as yours using Financial Institution ABC's vast database of historical enrollment records.

204 — Program expectations summary

Total A/P file volume — $461,833,403

Commercial card

206 — Recommended for onboarding — $314,598,315
Customized conversion rate — 21.94%
Expected A/P card program size — $68,833,068

ACH

Recommended for onboarding — $387,345,338
Historical conversion rate — 49.81%
Expected A/P ACH program size — $182,948,188

Out of 60,915 transactions analyzed, we forecast that 20,526 will be converted to an electronic form of payment. With $2.00 in savings, on average, per payment, you can expect to save $41,843 annually on reduced transaction cost.

210 — Financial Institution ABC's AP card solutions are currently accepted by more than 102,000 merchants. Using your file, we were able to match 342 supplier(s), representing $40,727,975 in spend, to merchant already processing transactions through our AP payment solutions.

Campaign and forecasted outcomes

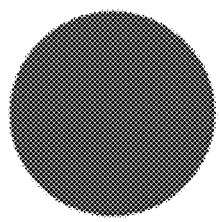 

208 — Current / Target

FIG. 2

Customized A/P Program

Campaigns and forecasted outcomes (Other payment types)

| Supplier payment solutions (SPS) | Payment Campaigns | Payment Spend | Expected Suppliers | Expected Spend |
|---|---|---|---|---|
| SPS card | 71 | $47,560,893 | 36 | $23,780,446 |
| SPS distributors (ACH) | 11 | $9,357,886 | 11 | $9,357,886 |
| SPS ACH | 11 | $4,662,349 | 11 | $4,662,349 |
| Totals | 93 | $61,581,128 | 58 | $37,800,681 |
| Grand totals | 93 | $61,581,128 | 58 | $37,800,681 |

Not recommended for automation

| | Payment Campaigns | Payment Spend | Expected Suppliers | Expected Spend |
|---|---|---|---|---|
| Suppliers < $2k | 7,844 | $1,784,559 | 0 | $0 |
| Totals | 7,844 | $1,784,559 | 0 | $0 |

A/P file breakdown

| | <$2,500 | <$7,000 | <$15,000 | <$25,000 | <$50,000 | >$50,000 | Total |
|---|---|---|---|---|---|---|---|
| AP card | $2,658,190 | $4,066,902 | $5,699,343 | $5,180,473 | $16,701,905 | $40,727,975 | |
| Level 2 line item | $1,891,841 | $5,966,857 | $5,903,858 | $8,032,204 | $22,209,033 | $31,057,386 | |
| Level 3 summary | $6,052,705 | $9,490,457 | $10,310,871 | $26,802,526 | $36,100,891 | $18,580,382 | |
| Level 2 | $5,683,447 | $8,044,301 | $7,355,480 | $7,230,893 | $26,109,180 | $9,048,057 | |
| Level 1 | $2,799,750 | $7,017,788 | $8,639,608 | $14,484,340 | $42,986,207 | $9,606,651 | |
| Non-eligible | $5,467,896 | $10,079,023 | $13,909,860 | $30,719,422 | $42,972,020 | $22,603,442 | |
| Totals | $24,611,898 | $45,465,228 | $68,876,729 | $96,410,860 | $167,155,328 | $461,623,403 | |

FIG. 3

COMMERCIAL CREDIT CARD SYSTEM

RELATED APPLICATIONS

This application is a continuation of U.S. patent application Ser. No. 15/002,541 entitled COMMERCIAL CREDIT CARD SYSTEM and filed Jan. 21, 2016, the entire contents of each of which are incorporated herein by reference.

TECHNICAL FIELD

The invention relates to processing financial data.

BACKGROUND

Commercial credit cards have long provided card holders with a convenient and economic payment option with customer suppliers accepting the commercial credit card. However, not all customer suppliers may accept a commercial credit card. Financial institutions may make efforts, including phone and/or mail campaigns, to onboard its customer's suppliers to acceptance of a commercial credit card or other electronic payment in order to save time and transaction costs for the customer and/or the suppliers.

SUMMARY

In general, this disclosure describes techniques for providing a commercial credit card system. Conventionally, financial institutions may predict the likelihood of a customer's supplier accepting a commercial credit card and develop onboarding campaigns for the customer's suppliers based on generic industry data. For example, a third party may group suppliers by industry and may assign a likelihood of acceptance of a commercial credit card based on the assigned group. Financial institutions or other interested parties may then use these likelihoods to predict a likelihood of card acceptance for a particular supplier.

In order to present a more robust, effective, and technically efficient system for onboarding a customer's suppliers, the disclosed techniques enable a commercial credit card system to perform additional actions including analyzing a customer's specific supplier data as well as a financial institution's data from previous onboarding efforts. According to the disclosed techniques, a supplier analysis and onboarding ("SAO") unit may be configured to analyze, using one more computing devices, information about the customer's suppliers and outcomes of campaigns to other suppliers with similarities to the customer's suppliers and develop predictions and strategies for more effectively and efficiently onboarding the customer's suppliers to acceptance of payment with the commercial credit card. The unit may collect and analyze large amounts of data some multiple sources, including from the customer, the financial institution, and/or other parties, to more accurately determine outcomes, including the likelihood of an individual supplier to accept a commercial credit card, a total number of suppliers of a customer predicted to accept the card, the transaction volume between a customer and a supplier predicted to be converted to payment using the card, and/or the total transaction volume of a customer predicted to be converted to payment with the card.

For example, the SAO unit described in this disclosure may be configured to electronically gather and analyze data in a manner not previously possible with conventional commercial credit card onboarding campaigns. According to aspects of this disclosure, the SAO unit may analyze a supplier's industry type, transactions between the customer and the supplier, and past campaigns by the financial institution involving similar suppliers; assign the supplier to a profile type, and make predictions regarding the supplier's likelihood of accepting payment by the commercial credit card as well as the amount of the supplier's transactions with the customer likely to be converted to payment by the commercial credit card. The SAO unit may further develop campaign strategies for onboarding one or more suppliers of the customer based on the information from the customer and from past campaigns conducted by the financial institution to more effectively and efficiently convert suppliers to acceptance of payment by the commercial credit card.

In one example, this disclosure is directed to a method comprising receiving, by one or more interfaces and from one or more sources, supplier data; and supplier profile data. The supplier data comprises transactional data indicating transactions between a customer and a supplier to the customer; and an industry type of the supplier. The supplier profile data comprises supplier acceptance category information and profile type information. The supplier acceptance category information associates each of a plurality of predetermined supplier acceptance categories with one or more industry types. The profile type information associates each of a plurality of predetermined profile types with one or more transaction characteristics of a plurality of transaction characteristics and one or more supplier acceptance categories of the plurality of predetermined supplier acceptance categories. The method further comprises determining, by one or more processors, a transaction characteristic, of the plurality of transaction characteristics, associated with the transactions based on the transactional data; determining, by the one or more processors, a supplier acceptance category, from the plurality of predetermined supplier acceptance categories, associated with the supplier based on the industry type and the supplier acceptance category information; determining, by the one or more processors, a profile type, from a plurality of predetermined profiles types, associated with the supplier based on the transaction characteristic, the supplier acceptance category, and the profile type information; and outputting, by the one or more processors, the profile type.

In another example, this disclosure is directed to a computing device comprising one or more interfaces; and one or more processors. The one or more interfaces are configured to receive, from one or more sources, supplier data and supplier profile data. The supplier data comprises transactional data indicating transactions between a customer and a supplier to the customer; and an industry type of the supplier. The supplier profile data comprises supplier acceptance category information that associates each of a plurality of predetermined supplier acceptance categories with one or more industry types; and profile type information that associates each of a plurality of predetermined profile types with one or more transaction characteristics of a plurality of transaction characteristics and one or more supplier acceptance categories of the plurality of predetermined supplier acceptance categories. The one or more processors are configured to determine a transaction characteristic, of the plurality of transaction characteristics, associated with the transactions based on the transactional data; determine a supplier acceptance category, from the plurality of predetermined supplier acceptance categories, associated with the supplier based on the industry type and the supplier acceptance category information; determine a profile type, from a plurality of predetermined profiles types, associated with the supplier based on the transaction characteristic, the supplier acceptance category, and the profile type information; and output the profile type.

In a further example, this disclosure is directed to a non-transitory computer-readable storage medium having stored thereon instructions that, when executed, cause a processor to determine, by one or more processors, a transaction characteristic, of a plurality of transaction characteristics, associated with transactions based on transactional data indicating the transactions between a customer and a supplier to the customer; determine a supplier acceptance category, from a plurality of predetermined supplier acceptance categories, associated with the supplier based on an industry type of the supplier and supplier acceptance category information that associates each of the plurality of predetermined supplier acceptance categories with one or more industry types; determine a profile type, from a plurality of predetermined profiles types, associated with the supplier based on the transaction characteristic, the supplier acceptance category, and profile type information, wherein the profile type information associates each of the plurality of predetermined profile types with one or more transaction characteristics of the plurality of transaction characteristics and one or more supplier acceptance categories of the plurality of predetermined supplier acceptance categories; and output the profile type.

The details of one or more examples of the invention are set forth in the accompanying drawings and the description below. Other features, objects, and advantages of the invention will be apparent from the description and drawings, and from the claims.

BRIEF DESCRIPTION OF DRAWINGS

FIG. 2 illustrates an example graphical user interface ("GUI") on a display of a customer computer of a customized campaign for acceptance of a commercial card by a customer's suppliers and projected outcomes, in accordance with the techniques of this disclosure.

FIG. 3 illustrates an additional example GUI on a display of a customer computer of a customized campaign for acceptance of a commercial card by a customer's suppliers and projected outcomes, in accordance with the techniques of this disclosure.

DETAILED DESCRIPTION

Figure 1:
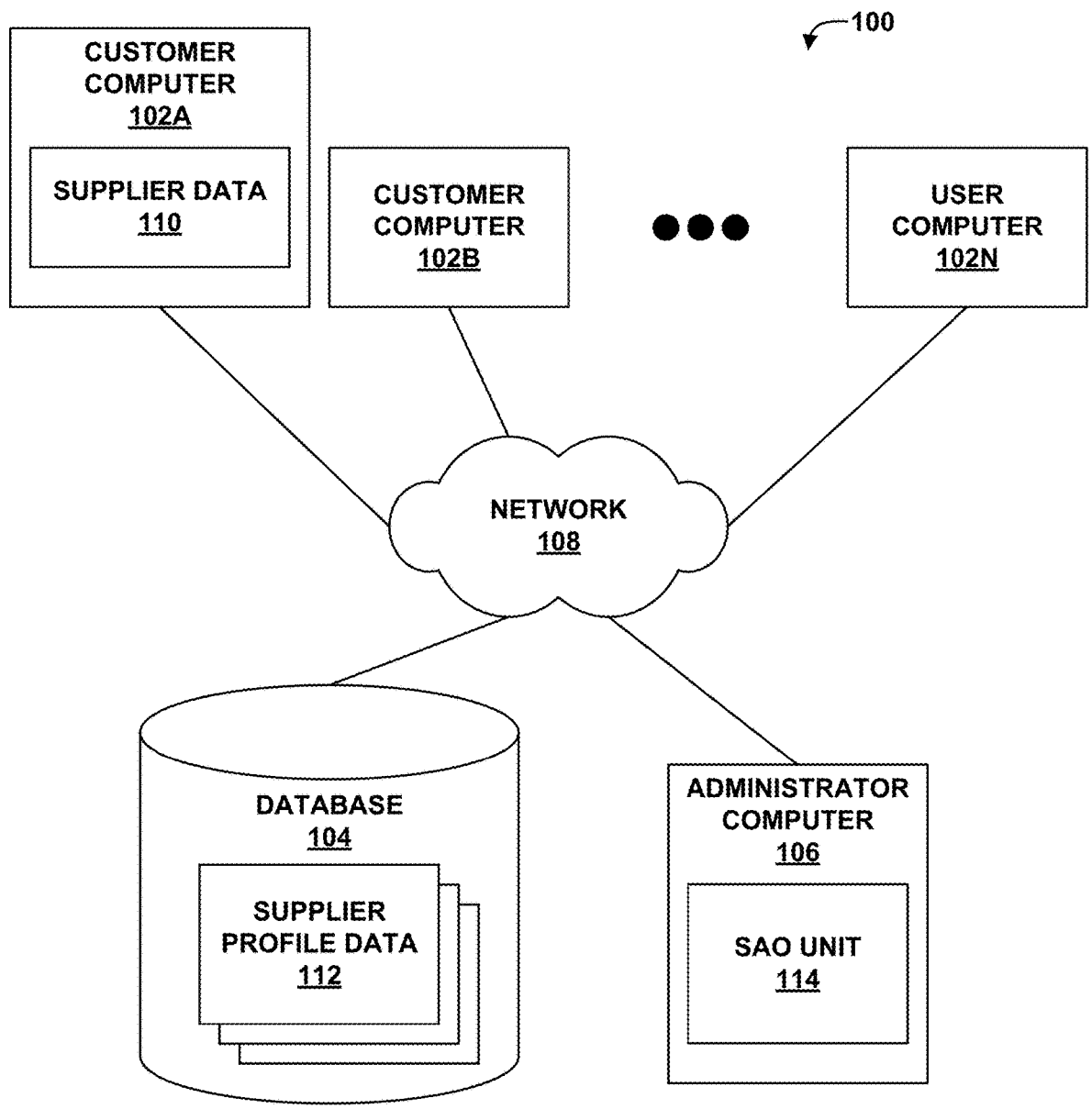
FIG. 1 is a block diagram illustrating an example commercial card system that includes an SAO unit configured to provide projections regarding supplier acceptance of a commercial credit card and campaign strategies for converting suppliers to acceptance of the commercial credit card based on supplier data and supplier profile data, in accordance with the techniques of this disclosure.

FIG. 1 is a block diagram illustrating an example commercial card system that includes an SAO unit 114 configured to provide projections regarding supplier acceptance of a commercial credit card and campaign strategies for converting suppliers to acceptance of the commercial credit card based on supplier data 110 and supplier profile data 112, in accordance with the techniques of this disclosure.

In this example, commercial credit card system 100 includes administrator computer 106, database 104, and one or more customer computers 102A-102N (collectively, customer computers 102) in communication with each other via network 108. Customer computer 102A may include supplier data 110. Database 104 may include supplier profile data 112. Administrator computer 106 may include SAO unit 114.

Network 108 may comprise a private network including, for example, a private network associated with a financial institution, or may comprise a public network, such as the Internet. Although illustrated as a single entity, network 108 may comprise a combination of networks.

Customer computers 102 may be one or more computing devices associated with one or more customers of a financial institution associated with SAO unit 114. Customer computers 102 may include one or more computing devices including, for example, one or more desktop computer, laptop, workstation, and/or wireless device such as a wireless phone or tablet. Customer computers 102 may be configured to store and transmit supplier data 110 associated with a customer and one or more suppliers of the customer. For example, customer computer 102A may receive supplier data 110, including data associated with one or more suppliers of a customer associated with customer computer 102A, and may include one or more interfaces for transmitting supplier data 110 to SAO unit 114 via network 108. Customer computer 102A may also be able to transmit and receive supplier data 110 from one or more other sources including database 104.

Supplier data 110 may include, for example, transactional data indicating one or more transactions between a customer and a supplier of the customer. A supplier of the customer may generally refer to an entity that sells goods and/or services to a customer. For example, supplier data 110 may include information about transactions between a customer and a supplier including dates, amounts, and/or payment types for transactions between the customer and the supplier. Supplier data 110 may also include an industry type of one or more suppliers. For example, for a given supplier, an industry type may be "office supplies," "grocery store," or any other suitable industry type. Supplier data 110 may additionally include contact information for one or more suppliers. Supplier data 110 may include information for suppliers of a particular customer and/or for suppliers of multiple customers. For example, supplier data 110 may include accounting records for a particular customer that includes information on transactions of the customer with the customer's suppliers. Supplier data 110 may be stored in a database, including in one or more spreadsheets, or in any other suitable format.

Database 104 may be a data structure for storing data related to the commercial card system 100 including supplier profile data 112. Database 104 may be stored by any suitable party and in any suitable location according to particular needs. For example, database 104 may be stored and maintained by a financial institution associated with commercial card system 110 or by a third-party vendor that stores and maintains data. Although illustrated as a single database 104, any suitable number of databases may be used for storing the data described according to particular needs. Although shown as being separate from administrator computer 106, in certain examples, database 104 may be stored and executed within administrator computer 106.

Supplier profile data 112 may include, for example, supplier acceptance category information that associates each of a plurality of predetermined supplier acceptance categories with one or more industry types. For example, for a given industry type, supplier acceptance category information may be used to determine a supplier acceptance category associated with the industry type. Supplier profile data 112 may also include profile type information that associates each of a plurality of predetermined profile types with one or more transaction characteristics of a plurality of transaction characteristics and one or more supplier acceptance categories of the plurality of predetermined supplier acceptance categories. For example, a transaction characteristic may include, for example, an average transaction amount for transactions between a supplier and a customer (e.g., all transactions or transactions over a specific time frame such as the past year or the last fiscal year), a median transaction amount for transactions between a supplier and a customer, a frequency of transactions between the supplier and the customer, or any other suitable transaction characteristic. Profile type information may be used to determine a profile type associated with a transaction characteristic and a supplier acceptance category.

Administrator computer 106 may be associated with one or more financial institutions including, for example a traditional bank, credit union, and/or credit card company with the capability to maintain commercial credit card accounts. Administrator computer 106 may be a centralized computing device configured to execute SAO unit 114 for providing customized campaigns for acceptance of a commercial card by a customer's suppliers and projected outcomes. Administrator computer 106 may comprise a cluster of one or more computers, workstations, servers, and the like. Administrator computer 106 configured to execute SAO unit 114 may be physically or virtually included within an internal network of a financial institution. Alternatively, administrator computer 106 configured to execute SAO unit 114 may be physically or virtually included in a network hosted by a third-party vendor. For example, a vendor of a financial institution may store and maintain SAO unit 114 for a financial institution and/or may provide the functions of SAO unit 114 as a service to a financial institution.

Administrator computer 106 may include one or more interfaces for allowing SAO unit 114 to communicate with one or more databases (e.g., database 104), devices and/or networks via one or more networks, e.g. network 108. The one or more interfaces may include one or more network interface cards, such as Ethernet cards, and/or any other type of device that can send and receive information. In some examples, SAO unit 114 utilizes the one or more interfaces to communicate with customer computers 102, database 104, and/or any other suitable device. Any suitable number of interfaces may be used to perform the described functions according to particular needs.

Administrator computer 106 may include one or more processors configured to implement functionality and/or process instructions for execution within SAO unit 114. The processor may include, for example, microprocessors, digital signal processors (DSPs), application specific integrated circuits (ASICs), field-programmable gate array (FPGAs), and/or equivalent discrete or integrated logic circuitry.

Administrator computer 106 may include memory configured to store information within administrator computer 106. The memory may include a computer-readable storage medium or computer-readable storage device. In some examples, the memory may include one or more of a short-term memory or a long-term memory. The memory may include, for example, random access memories (RAM), dynamic random access memories (DRAM), static random access memories (SRAM), magnetic hard discs, optical discs, floppy discs, flash memories, or forms of electrically programmable memories (EPROM), or electrically erasable and programmable memories (EEPROM). In some examples, the memory may store logic (e.g., SAO unit 114) for execution by one or more processors. The memory may be used by SAO unit 114 to temporarily store information during program execution.

Customer computers 102, administrator computer 106, and/or any other suitable devices for executing the SAO system 100 may include one or more displays for displaying a GUI that may allow a user to interact with the devices by display of graphical icons and visual indicators. For example, displays may present one or more GUIs that display projected outcomes or proposed campaign strategies for suppliers of a customer. In certain examples, any of the displays may be a touch sensitive screen and may present one or more touch sensitive GUI elements. For example, a user may be able to interact with a display to respond to options displayed on the display and initiate an action by touching one or more of the touch sensitive GUI elements displayed on the display. For example, the display may be a presence-sensitive display that displays a GUI and receives input from a user using capacitive, inductive, and/or optical detection at or near the presence sensitive display. Alternatively or in addition, a user may be able to interact with a device to respond to options displayed on the display and initiate an action by using any suitable input device such as, for example, a keyboard, touchpad, and/or any other suitable input device. A display may comprise a cathode ray tube (CRT) monitor, a liquid crystal display (LCD), organic light emitting diode (OLED), or any other type of display device that can generate intelligible output to a user.

SAO unit 114 may include instructions executed by a processor to perform the functions of SAO unit 114 as described herein. SAO unit 114 may include rules for determining customized campaigns for acceptance of a commercial card by a customer's suppliers and/or projected outcomes based on information retrieved from customer computers 102, database 104, and/or any other suitable information for determining a recommended action.

SAO unit 114 may access, via network 108, supplier data 110. For example, administrator computer 106 may include one or more interfaces and may receive, by the one or more interfaces and from one or more sources including, for example, customer computer 102, supplier data 110. The received supplier data 110 may include, for example, transactional data indicating transactions between a customer and a supplier to the customer; and an industry type of the supplier.

SAO unit 114 may also access, via network 108, supplier profile data 112. For example, administrator computer 106 may receive, by one or more interfaces and from one or more sources including, for example, database 104, supplier profile data 112. The received supplier profile data 112 may include, for example, supplier acceptance category information that associates each of a plurality of predetermined supplier acceptance categories with one or more industry types. The received supplier profile data 112 may additionally include profile type information that associates each of a plurality of predetermined profile types with one or more transaction characteristics of a plurality of transaction characteristics and one or more supplier acceptance categories of the plurality of predetermined supplier acceptance categories.

In operation, according to aspects of this disclosure, SAO unit 114 may be used to determine and communicate one or more customized campaigns for acceptance of a commercial card by a customer's suppliers and/or projected outcomes to a user of customer computer 102A, a user of administrator computer 106, or to any other suitable party according to particular needs.

SAO unit 114 may determine a transaction characteristic, of the plurality of transaction characteristics, associated with the transactions based on the transactional data. For example, SAO unit 114 may determine an average transaction amount for transactions between the customer and the supplier over the previous fiscal year. SAO unit 114 may determine a supplier acceptance category, from the plurality of predetermined supplier acceptance categories, associated with the supplier based on the industry type and the supplier acceptance category information. For example, SAO unit 114 may look up a supplier acceptance category in the supplier acceptance category information based on the industry type of the supplier in supplier data 110. SAO unit 114 may determine a profile type, from a plurality of predetermined profiles types, associated with the supplier based on the transaction characteristic, the supplier acceptance category, and the profile type information. For example, SAO unit 114 may look up a profile type in the profile type information based on the transaction characteristic and the supplier acceptance category. SAO unit 114 may output the profile type.

According to aspects of this disclosure, the outputted profile type for a supplier may be used in determining a customized campaign for acceptance of a commercial card by the customer's suppliers and a projected outcome of the campaign. For example, the profile type may be associated with a likelihood of acceptance of a commercial credit card by a supplier, such that the determined profile type for a supper indicates the projected likelihood of the vendor accepting the commercial credit card. SAO unit 114 may determine profile types for one or more suppliers of a customer to determine the likelihood of any or all of the suppliers of accepting the commercial credit card, to determine the amount and/or percentage of annual expenditures of the customer that is projected to be converted to expenditures using the commercial credit card, and/or to determine a campaign strategy for converting suppliers to acceptance of the commercial credit card.

For example, after determining a percentage of annual expenditures of the customer that is projected to be converted to expenditures using the commercial credit card, SAO unit 114 may multiply the percentage by the amount of expenditures by the customer with that supplier to project the amount of expenditures by the customer with that supplier likely to be able to be made with the commercial credit card in the future. SAO unit 114 may additionally perform this analysis for each supplier of the customer to project the total amount of expenditures by the customer with all of its suppliers likely to be able to be made with the commercial credit card in the future. SAO unit 114 may additionally sum the projected likelihoods of each supplier converting to acceptance of payment by the commercial credit card to determine the total number of the customer's suppliers predicted to convert. SAO unit 114 may also develop a campaign strategy for contacting suppliers to convert suppliers to accepting the commercial credit card. For example, suppliers with the largest determined likelihood of acceptance or the largest projected converted expenditure may be contacted before other suppliers.

In this way, certain techniques of this discourse may, in some instances, provide a technical solution to gathering and analyzing data for commercial credit cards. For example, SAO unit 114 may gather and analyze large amounts of data from multiple sources to more accurately predict outcomes of campaigns to onboard suppliers to acceptance of a commercial credit card and/or to formulate more effective and efficient onboarding campaigns. More accurate prediction and efficient and effective campaign strategies may result in reduction in resources, including human, capital, and technological resources. For example, more efficient campaigns may result in fewer resources for onboarding a customer's suppliers. More effective campaigns may result in onboarding of more suppliers, which may result in more efficient, electronic transactions for the customer that require fewer resources than transactions using alternative types of payment, including case and checks.

FIG. 2 illustrates an example GUI 200 on a display of customer computer 102A showing a customized campaign for acceptance of a commercial credit card by a customer's suppliers and projected outcomes, in accordance with the techniques of this disclosure.

GUI 200 may show a report for presentation to a customer on customer computer 102A. The report may include an explanation for a customer of how "Financial Institution ABC" may help the customer to convert the customer's supplier purchases to electronic payment. The report may describe analysis of a customer's accounts payable ("A/P") file, which may include, for example, supplier data 110.

Summary element 202 may include a summary of information in supplier data 110. For example, summary element 202 may indicate a volume of transactions for all transactions indicated in transactional data of the supplier data 110. For example, summary element 202 may indicate that the total volume of the transactions listed in the transactional data is $461,833,403.

Commercial card element 204 may indicate information regarding converting transactions of the customer to payment by a commercial credit card. For example, commercial card element 204 may indicate that a transaction volume of $314,299,311 is suggested for targeted campaigning for conversion to payment by a commercial credit card. For example, Financial Institution ABC may recommend campaigning to convert selected suppliers to accepting the commercial credit card and those suppliers may be associated with customer transactions totaling $314,299,311 such that the targeted transaction volume recommended for onboarding is $314,299,311.

Commercial card element 204 may also indicate an expected A/P card program size. For example, SAO unit 114 may predict the likelihood of a particular supplier accepting the commercial credit card based on a profile type determined for the supplier. SAO unit 114 may multiply the likelihood by the transaction volume for the supplier to determine the projected amount of converted transaction volume for that supplier. SAO unit 114 may sum the projected transaction volumes for each supplier recommended for onboarding to arrive at an expected A/P card program size which, in the illustrated example, is $68,953,068.

Commercial card element 204 may also indicate a customized conversion rate. For example, in the illustrated example, the customized conversion rate may be 21.94%. For example, the customized conversion rate may be the amount of the transaction volume recommending for onboarding that Financial Institution ABC projects to be converted to transactions by the commercial card. As described above, SAO unit 114 may determine an expected A/P card program size which, in the illustrated example, is $68,953,068 and may determine a transaction volume recommended for onboarding of $314,299,311. SAO unit 114 may divide the expected A/P card program size by the transaction volume recommended for onboarding to arrive at the customized conversion rate which, in the illustrated example, is 21.94%.

ACH element 206 may indicate information regarding converting transactions of the customer to payment by Automated Clearing House ("ACH"). For example, ACH element 206 may indicate that a transaction volume of $367,315,329 is suggested for targeted campaigning for conversion to payment by ACH. For example, Financial Institution ABC may recommend campaigning to convert selected suppliers to accepting ACH payment and those suppliers may be associated with customer transactions totaling $367,315,329 such that the targeted transaction volume recommended for onboarding is $367,315,329.

ACH element 206 may also indicate a historical conversion rate. For example, in the illustrated example, the historical conversion rate may be 49.81%. For example, the historical conversion rate may be the amount of the transaction volume recommending for onboarding that Financial Institution ABC projects to be converted to transactions by ACH based on historical data for conversion of suppliers to payment by ACH. As with the predicted conversion rate for payment by the commercial credit card, the historical conversion rate may be based on a profile type determined for each supplier recommended for onboarding to payment by ACH. In some examples, the historical conversion rate may be a historical conversion rate for all suppliers targeted for ACH payment in the past.

ACH element 206 may also indicate an expected A/P ACH program size. For example, in some examples, SAO unit 114 may predict the likelihood of a particular supplier accepting the payment by ACH based on a profile type determined for the supplier. SAO unit 114 may multiply the likelihood by the transaction volume for the supplier to determine the projected amount of converted transaction volume for that supplier. SAO unit 114 may then sum the projected transaction volumes for each supplier recommended for onboarding to arrive at an expected A/P ACH program size which, in the illustrated example, is $182,948,168. In some examples, SAO unit 114 may determine the expected A/P ACH program size by multiplying the transaction amount recommended for onboarding by the historical conversion rate.

Graph element 208 may graphically display information regarding the customized A/P program. For example, in the illustrated example, graph element 208 may include pie charts illustrated a distribution of payments by ACH, card, and check, including one pie chart with the current distribution and one with the target distribution. The target distribution illustrated may be based on the determined expected A/P card program size and the expected A/P ACH program size.

Campaign and forecasted outcomes element 210 may outline a campaign for targeting suppliers for conversion to payments by the commercial credit card and/or to payment by ACH, as well as forecasted outcomes of the campaign. For example, the columns labeled "pursued" may outline information for a campaign for converting suppliers to payment by commercial credit card and/or payment by ACH, including numbers of suppliers pursued and the spend (transaction amounts) associated with the pursued suppliers. For example, the table may indicate numbers of suppliers to be pursued by phone or mail for conversion to credit card as well as the spend associated with those suppliers.

In some examples, the table may further indicate suppliers to be targeted for payment by ACH, whether initially or after declining acceptance of the commercial credit card, as well as spend associated with those suppliers. The table may additionally include recommendations for conversion of suppliers to other payment types, including other electronic payment types and suppliers for which conversion from payment by check to electronic payment is not recommended, as well as spend associated with those suppliers. Campaign and forecasted outcomes element 210 may additionally include information for expected outcomes of the campaign including numbers of suppliers expected to be converted to commercial credit card, ACH, or other payment types and the spends associated with those suppliers that are expected to be converted.

FIG. 3 illustrates an example GUI 300 on a display of customer computer 102A showing a customized campaign for acceptance of a commercial credit card by a customer's suppliers and projected outcomes, in accordance with the techniques of this disclosure. GUI 300 may include a second portion of the campaign report shown in GUI 200 of FIG. 2.

Campaign and forecasted outcomes (Other payment types) element 302 may include a table illustrating additional information for other payment types, as summarized in FIG. 2. For example, the table may include pursued suppliers and the associated spend for targeted conversion to payment by secure payment solution ("SPS") card, SPS distributors (ACH), and SPS ACH, for example. The table may also indicate expected outcomes including suppliers and associated spend expected to be converted to payment by SPS card, SPS distributors (ACH), and SPS ACH.

Not recommended for automation element 304 may include information on suppliers not recommended for attempted conversion to electronic payment. For example, in the illustrated example, the table may indicate that 7,844 suppliers with spend totally $1,784,559 may not be recommended for attempted conversion to electronic payment.

A/P file breakdown 306 may include additional information for suppliers and transaction data in the A/P file of the customer. For example, a table may include information for targeted and non-targeted suppliers with annual transaction amounts in different ranges. For example, columns of the table may include information for suppliers with average transaction amounts in the ranges of <$2,500, $2,500 to <$7,000, $15,000 to <$25,000, $25,000 to <$50,000, and >$50,000.

Figure 4:
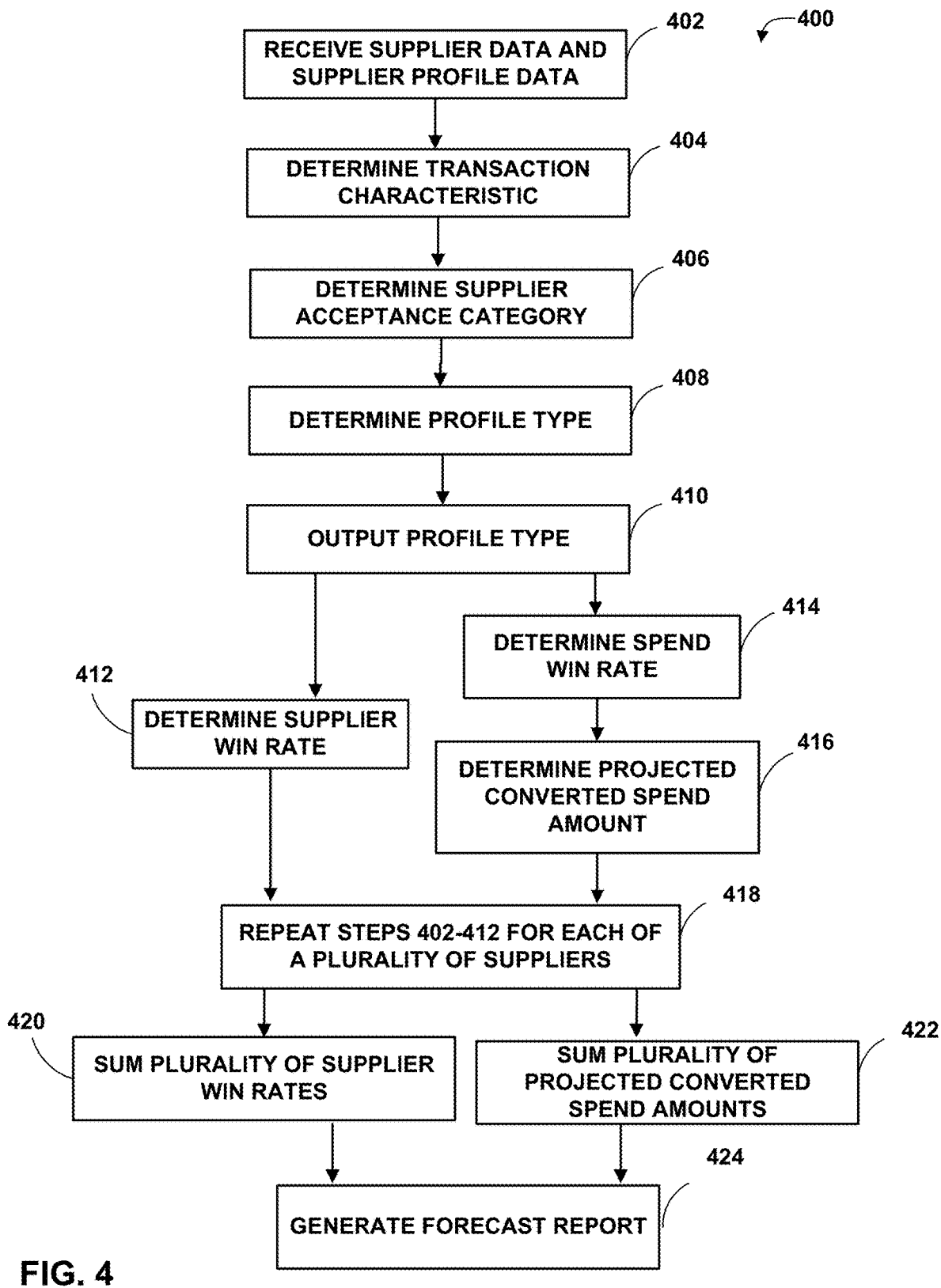
FIG. 4 is a flowchart illustrating an example operation of an SAO unit of the commercial card system, in accordance with the techniques of this disclosure.

FIG. 4 is a flowchart illustrating an example operation 400 of SAO unit 114 of the commercial card system 100, in accordance with the techniques of this disclosure. The example operation 400 is described with respect to multifunctional SAO unit 114 of administrator computer 106 of FIG. 1.

SAO unit 114 may receive supplier data 110 and supplier profile data 112 (402). For example, SAO unit 114 may receive supplier data 110 from customer computer 102A and supplier profile data from database 104. For example, as described above with reference to FIG. 1, supplier data 110 may comprise transactional data indicating transactions between a customer and a supplier to the customer and an industry type of the supplier. Supplier profile data 112 may comprise supplier acceptance category information that associates each of a plurality of predetermined supplier acceptance categories with one or more industry types. Supplier profile data 112 may further comprise profile type information that associates each of a plurality of predetermined profile types with one or more transaction characteristics of a plurality of transaction characteristics and one or more supplier acceptance categories of the plurality of predetermined supplier acceptance categories.

SAO unit 114 may determine a transaction characteristic (404). For example, SAO unit 114 may determine a transaction characteristic, of the plurality of transaction characteristics, associated with the transactions based on the transactional data. For example, SAO unit 114 may determine an average transaction amount for transactions between the supplier and the customer. In some examples, SAO unit 114 may average the transaction amounts for all transactions between the supplier and the customer or for transactions during a particular time frame, such as the past year or the pervious fiscal year. In some examples, SAO unit 114 the plurality of transaction characteristics may include a plurality of average transaction ranges, such as the ranges displayed in FIG. 3. In some examples, SAO unit 114 may select an average transaction range from the plurality of average transaction ranges corresponding to the average transaction amount. In other examples, the SAO unit 402 may determine a different transaction characteristic such as, for example, a median transaction amount or any other suitable transaction characteristic that may be useful for classifying the supplier's transactions with the customer.

SAO unit 114 may determine a supplier acceptance category (406). For example, SAO unit 114 may determine a supplier acceptance category, from the plurality of predetermined supplier acceptance categories, associated with the supplier based on the industry type and the supplier acceptance category information. For example, SAO unit 114 may look up the profile type in the profile type information based on the transaction characteristic and the supplier acceptance category.

SAO unit 114 may determine a profile type (408). For example, SAO unit 115 may determine a profile type, from a plurality of predetermined profiles types, associated with the supplier based on the transaction characteristic, the supplier acceptance category, and the profile type information. For example, SAO unit 114 may look up the profile type in the profile type information based on the transaction characteristic and the supplier acceptance category. SAO unit may output the determined profile type (410).

SAO unit 114 may determine a supplier win rate (412). For example, SAO unit 114 may receive credit card acceptance information and may determine a supplier win rate associated with the profile type based on the received credit card acceptance information. The supplier win rate may be indicative of a rate of acceptance of a credit card program by a first plurality of suppliers associated with the profile type. For example, the supplier win rate may be a rate of acceptance of the credit card program by a plurality of suppliers pursued in one or more past campaigns for conversion to acceptance of payment by a commercial credit card. The plurality of suppliers may also be associated with the profile type of the current supplier. In some examples, SAO unit 114 may output the supplier win rate.

SAO unit 114 may determine a spend win rate (414). For example, SAO unit 114 may determine a spend win rate associated with the profile type based on the credit card acceptance information. The spend win rate may be indicative of a percentage of a spend amount associated with the first plurality of suppliers associated with the profile type converted to payment associated with the credit card program. For example, the spend win rate may be a percentage of transactions of suppliers with the profile type of the current supplier that have been converted to payment by a commercial credit card in response to one or more campaigns to convert the suppliers to payment by commercial credit card.

SAO unit 114 may determine a projected converted spend amount (416). For example, SAO unit 114 may determine an amount of the transaction amount between the supplier and the customer projected to be converted to payment by commercial credit card. The SAO unit 114 may multiply the spend win rate by the spend volume associated with the supplier and the customer to determine the projected converted spend amount.

SAO unit 114 may repeat steps 402-416 or each of a plurality of suppliers (418). SAO unit 114 may repeat steps 402-416 for each of a plurality of suppliers associated with the customer, such as all suppliers in an A/P file of the customer as described with reference to FIG. 2, to determine supplier win rates and projected converted spend amounts for each of the plurality of suppliers. A customer's A/P file may include a substantially large number of suppliers and SAO unit 114 may be able to perform these steps effectively and efficiently for each of the suppliers in the A/P file to deliver accurate and timely results. This analysis may result in more efficient and effective predictions, campaign strategies, and payment systems.

SAO unit 114 may sum the plurality of supplier win rates (420). For example, SAO unit 114 may sum the plurality of supplier win rates to determine the total number of suppliers expected to accept the credit card program to, for example, convert payment to payment by commercial credit card. SAO unit 114 may output the total number of suppliers.

SAO unit 114 may sum the plurality of projected converted transaction volumes (422). For example, SAO unit 114 may sum the plurality of projected converted spend amounts to determine a customer spend amount expected to be converted to payment associated with the credit card program. SAO unit 114 may output the customer spend amount expected to be converted.

SAO unit may generate a report (424). For example, SAO unit 114 may generate a report such as that illustrated in FIGS. 2 and 3. In some examples, the report may indicate the customer spend amount expected to be converted to payment associated with the credit card program and/or the customer spend amount expected to be converted.

In some examples, example operation 400 may include more or fewer steps. In some examples, example operation 400 may include steps performed in any particular order according to particular needs. In some examples, SAO unit 114 may determine a card-acceptance-campaign strategy based on the plurality of supplier win rates. For example, SAO unit 114 may determine that suppliers with the largest supplier win rates should be targeted and/or that they should be targeted before other suppliers with lower supplier win rates. SAO unit 114 may further determine that some suppliers should be contacted by phone while others should be contacted by mail based on the supper win rate for those suppliers. Alternatively or in addition, SAO unit 114 may determine a campaign strategy based on the projected converted spend amounts determined for each supplier. For example, SAO unit 114 may determine that suppliers with large projected converted spend amounts should be contacted before those suppliers with smaller projected converted spend amounts. In some examples, SAO unit 114 may output the card-acceptance campaign strategy. SAO unit 114 may output a report detailing the strategy for contacting each of the suppliers.

In some examples, SAO unit 114 may receive a supplier response indicating acceptance or rejection of the credit card program by the supplier. For example, during or after a credit card acceptance campaign, a representative of Financial Institution ABC or of the customer may contact a supplier to ask the supplier to accept the credit card program and may input the supplier's response into administrator computer 106 or customer computer 102a or into any other suitable device. SAO unit 114 may update the credit card acceptance information based on the supplier response. The updated information may be used for projecting responses of suppliers of the same profile type in the future.

Figure 5:
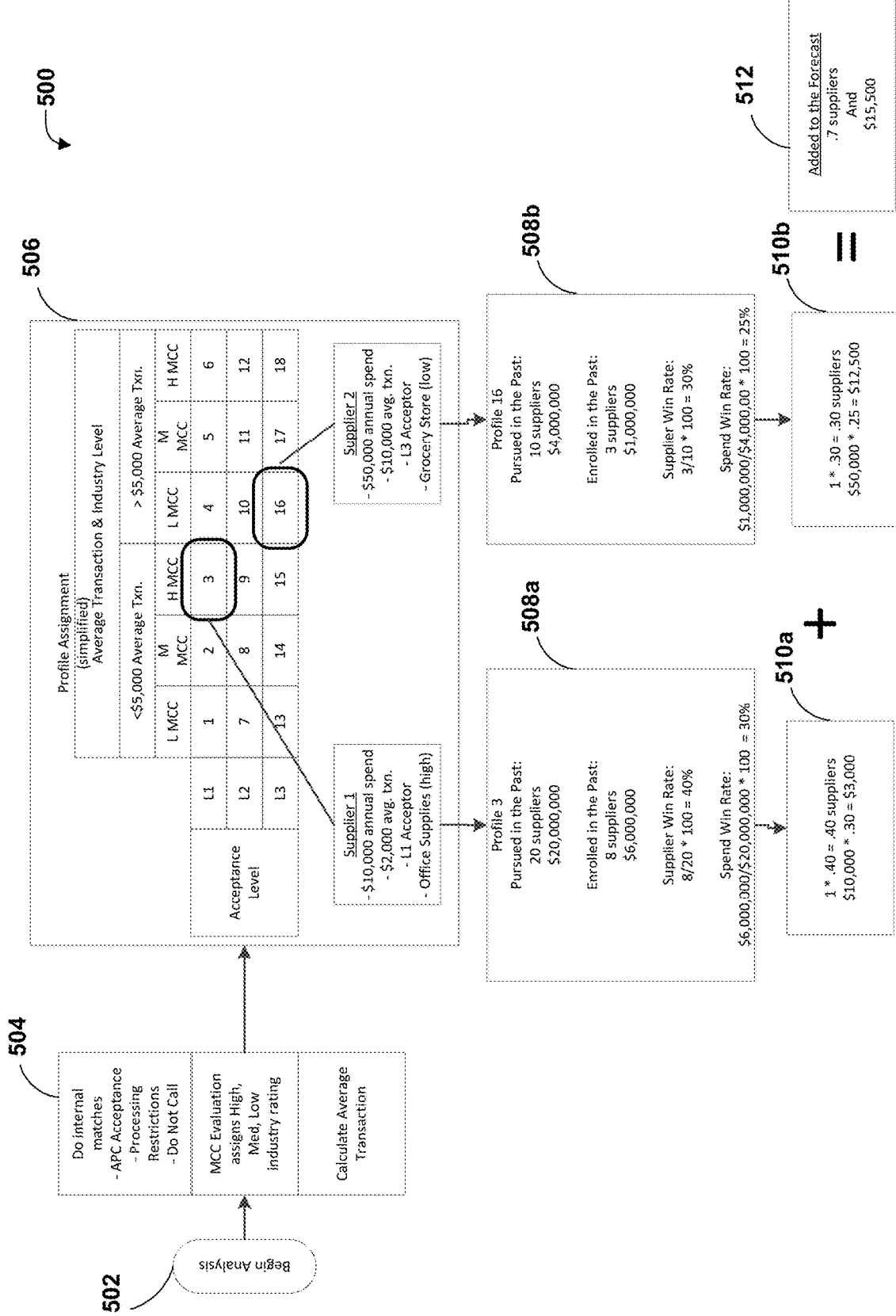
FIG. 5 is an additional flowchart illustrating an example operation of an SAO unit of the commercial card system, in accordance with the techniques of this disclosure.

FIG. 5 is an additional flowchart illustrating an example operation 500 of SAO unit 114 of the commercial card system 100, in accordance with the techniques of this disclosure.

SAO unit 114 may begin its analysis (502). SAO unit 114 may, for each of a plurality of suppliers of a customer, perform internal matches, determine a Multihousing Credit Control ("MCC") evaluation, and calculate an average transaction (504).

For example, SAO unit 114 may perform internal matches including grouping together some groups of suppliers for analysis together. For example, suppliers who previously accepted APC payment may be grouped together based on information in supplier data 110. SAO unit 114 may determine processing restrictions for each of the suppliers. For example, SAO unit 114 may determine suppliers that have indicated that they should not be called and may group and set aside those suppliers for separate analysis and/or for no analysis. SAO unit 114 may receive MCC evaluations for each of the suppliers. For example, SAO unit 114 may receive MCC evaluations for each of the suppliers from a third party. SAO unit 114 may calculate an average transaction for each supplier and the customer. For example, SAO unit 114 may calculate an average transaction amount for transactions between each supplier and the customer over the previous fiscal year.

SAO unit 114 may assign a profile type to each of a plurality of suppliers of the customer (506). For example, SAO unit 114 may determine a profile type based on an average transaction for the supplier, an MCC acceptance category and an industry type of the supplier. For example, SAO unit 114 may assign "Supplier 1" a profile type of "Profile 3" based on the $2,000 average transaction, L1 Acceptor MCC acceptance category, and the "Office Supplies (high)" industry type associated with Supplier 1 and may assign "Supplier 2" a profile type of "Profile 16" based on the $10,000 average transaction, L3 Acceptor MCC acceptance category, and the "Grocery Store (low)" industry type associated with Supplier 16.

SAO unit 114 may determine win rates for each supplier (508). For example, SAO unit 11 may determine win rates for Supplier 1 (508a) and for Supplier 2 (508b) based on outcomes from suppliers pursued in the past having the same profile type. For example, for Supplier 1 having a profile type of Profile 3, 20 suppliers with transaction amounts totaling $20,000,000 may have been pursued in the past. Of those pursued suppliers, 8 suppliers may have been enrolled in the credit card program and $6,000,000 in transactions by those suppliers may have been converted to payment by the credit card program. Based on those pursued and enrolled suppliers and associated amounts, the supplier win rate may be 8/20*100=40% and the spend win rate $6,000,000/$20,000,000*100=30%. For Supplier 2 having a profile type of Profile 3, 10 suppliers with transaction amounts totaling $4,000,000 may have been pursued in the past. Of those pursued suppliers, 3 suppliers may have been enrolled in the credit card program and $1,000,000 in transactions by those suppliers may have been converted to payment by the credit card program. Based on those pursued and enrolled suppliers and associated amounts, the supplier win rate may be 3/10*100=30% and the spend win rate $1,000,000/$4,000,000*100=25%.

SAO unit 114 may determine an expected number of converted suppliers and an expected converted spend for each supplier (510). For example, SAO unit 114 may determine an expected number of converted suppliers and an expected converted spend for Supplier 1 (510a) and for Supplier 2 (510b) based on the determined win rates for each supplier. For example, for Supplier 1, the expected number of converted suppliers may be 1 supplier×0.4 win rate=0.40 suppliers and the expected converted spend may be $10,000×0.30 spend win rate=$3,000. For Supplier 2, the expected number of converted suppliers may be 1 supplier×0.3 win rate=0.30 suppliers and the expected converted spend may be $50,000×0.25 spend win rate=$12,500.

SAO unit 114 may add the determined expected number of converted suppliers and the expected converted spin amounts to the forecast (512). For example, SAO unit 114 may sum the expected number of converted suppliers for each of the plurality of suppliers to arrive at 0.40+0.30=0.7 suppliers expected to be converted and may sum the expected converted spend amounts to arrive at $3,000+$12,500=$15,500. SAO unit 114 may perform the analysis for any suitable number of suppliers of a customer to determine a forecast of the expected outcome of a credit card acceptance campaign and/or to develop a campaign strategy for converting the suppliers to payment by the credit card program.

As described with reference to FIG. 4, fewer or additional steps may be performed and the steps of the example operation 500 may be performed in any suitable order according to particular needs.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Although particular reports have been illustrated, the system may create any suitable reports according to particular needs. For example, the system may create a detailed report providing information regarding particular suppliers that may be of interest to the customer and/or the financial institution. The system may select suppliers of interest by selecting suppliers recommended for targeting for conversion to electronic payment, whether for payment by a commercial credit card or by other electronic payment. Reports may be standardized or customized based on user input.

Additionally, the system may interact with one or more other systems, whether internal or external to a financial institution or other administrator of the system. For example, the system may be configured to interact with one or more contact management systems.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Techniques of this disclosure may provide one or more technical advantages. For example, analyzing the customer's supplier data, including transactional data, may allow for more accurately predicting likelihood of onboarding the customer's suppliers than other techniques that rely on less or different data. Additionally, storing and analyzing results from previous onboarding campaigns by a financial institution may also result in more accurate predictions. Additionally, the described techniques may more accurately predict transaction amounts likely to be converted to payment by commercial credit card to more efficiently target suppliers with larger expected converted transaction amounts. These more accurate predictions may also allow for more effective campaign strategies, which may result in higher rate of and more efficient onboarding as well reduction of necessary resources, including human, capital, and technological resources. More efficient analysis and campaign strategies may result in reduced computer processing and storage resources needed for implementing less efficient analysis and campaign strategies.

Various examples have been described. These and other examples are within the scope of the following claims.

What is claimed is:

1. A method comprising:
   receiving, by one or more interfaces and from one or more sources:
      supplier data, from one or more customer computing devices and for a first plurality of suppliers, comprising transactional data including a total amount of transactions between a customer of a financial institution and a supplier to the customer over a period of time, and an industry type of the supplier, and
      credit card acceptance information, from one or more databases, indicating acceptance or rejection of a commercial credit card program by a second plurality of suppliers;
   determining, by one or more processors and for each supplier of the first plurality of suppliers, an average transaction amount for the transactions between the customer and the supplier;
   determining, by the one or more processors and for each supplier of the first plurality of suppliers, a profile type based on the average transaction amount and the industry type of the supplier;
   determining, by the one or more processors and for each supplier of the first plurality of suppliers based on the credit card acceptance information, a supplier win rate associated with the profile type, wherein the supplier win rate is indicative of a rate of acceptance of the credit card program by a portion of the second plurality of suppliers associated with the profile type;
   determining, by the one or more processors and for each supplier of the first plurality of suppliers based on the credit card acceptance information, a spend win rate based on the respective profile type, wherein the spend win rate is indicative of a percentage of a spend amount by the portion of the second plurality of suppliers associated with the profile type converted to a payment amount associated with the commercial credit card program;
   determining, by the one or more processors and for each supplier of the first plurality of suppliers, a projected converted spend amount associated with the supplier based on the respective spend win rate and the total amount of the transactions between the customer and the respective supplier over the period of time;
   determining, by the one or more processors and for the first plurality of suppliers, a customer spend amount expected to be converted to payment associated with the commercial credit card program by summing the plurality of projected converted spend amounts of the first plurality of suppliers;

determining, by the one or more processors, a card-acceptance-campaign strategy based on at least one of the supplier win rates, the supplier spend rates, or the projected converted spend amounts for the first plurality of suppliers, wherein the card-acceptance-campaign strategy comprises a campaign strategy for converting the first plurality of suppliers to payment by the commercial credit card program, and wherein the card-acceptance-campaign strategy comprises prioritizing each supplier with respect to the first plurality of suppliers based on at least one of the supplier win rate, the spend win rate, or the projected converted spend amount; and outputting, by the one or more processors and to a graphical user interface, the card-acceptance campaign strategy, wherein the card-acceptance strategy includes the customer spend amount for the first plurality of suppliers.

2. The method of claim 1, wherein the card-acceptance-campaign strategy comprises prioritizing the supplier with respect to the first plurality of suppliers based on the projected converted spend amount.

3. The method of claim 1, wherein the card-acceptance-campaign strategy comprises prioritizing the supplier with respect to the first plurality of suppliers based on the supplier win rate.

4. The method of claim 1, wherein the card-acceptance-campaign strategy includes a type of communication for contacting the first plurality of suppliers.

5. The method of claim 1, wherein the card-acceptance-campaign strategy includes an order for contacting the first plurality of suppliers.

6. The method of claim 1, further comprising outputting, by the one or more processors, a report detailing the card-acceptance-campaign strategy for contacting the first plurality of suppliers.

7. The method of claim 1, further comprising:
receiving, by the one or more processors, a supplier response, the supplier response indicating acceptance or rejection of the commercial credit card program by the supplier; and
updating, by the one or more processors, the credit card acceptance information based on the supplier response.

8. The method of claim 1, further comprising generating, by the one or more processors, a report for the customer, the report indicating the customer spend amount expected to be converted to payment associated with the credit card program.

9. A computing device comprising:
one or more interfaces configured to receive, from one or more sources:
supplier data, from one or more customer computing devices and for a first plurality of suppliers, comprising transactional data including a total amount of transactions between a customer of a financial institution and a supplier to the customer over a period of time, and an industry type of the supplier, and
credit card acceptance information, from one or more databases, indicating acceptance or rejection of a commercial credit card program by a second plurality of suppliers;
one or more processors configured to:
determine, for each supplier of the first plurality of suppliers, an average transaction amount for the transactions between the customer and the supplier;
determine, for each supplier of the first plurality of suppliers, a profile type based on the average transaction amount and the industry type of the supplier;
determine, for each supplier of the first plurality of suppliers and based on the credit card acceptance information, a supplier win rate associated with the profile type, wherein the supplier win rate is indicative of a rate of acceptance of the credit card program by a portion of the second plurality of suppliers associated with the profile type;
determine, for each supplier of the first plurality of suppliers and based on the credit card acceptance information, a spend win rate based on the respective profile type, wherein the spend win rate is indicative of a percentage of a spend amount by the portion of the second plurality of suppliers associated with the profile type converted to a payment amount associated with the commercial credit card program;
determine, for each supplier of the first plurality of suppliers, a projected converted spend amount associated with the supplier based on the respective spend win rate and the total amount of the transactions between the customer and the respective supplier over the period of time;
determine, for the first plurality of suppliers, a customer spend amount expected to be converted to payment associated with the commercial credit card program by summing the plurality of projected converted spend amounts of the first plurality of suppliers;
determine a card-acceptance-campaign strategy based on at least one of the supplier win rates, the supplier spend rates, or the projected converted spend amounts for the plurality of suppliers, wherein the card-acceptance-campaign strategy comprises a campaign strategy for converting the first plurality of suppliers to payment by the commercial credit card program, and wherein the card-acceptance-campaign strategy comprises prioritizing the supplier with respect to the plurality of suppliers based on at least one of the supplier win rate, the spend win rate, or the projected converted spend amount; and
output, to a graphical user interface, the card-acceptance campaign strategy, wherein the card-acceptance strategy includes the customer spend amount for the first plurality of suppliers.

10. The computing device of claim 9, wherein the card-acceptance-campaign strategy comprises prioritizing the supplier with respect to the first plurality of suppliers based on the projected converted spend amount.

11. The computing device of claim 9, wherein the card-acceptance-campaign strategy comprises prioritizing the supplier with respect to the first plurality of suppliers based on the supplier win rate.

12. The computing device of claim 9, wherein the card-acceptance-campaign strategy includes a type of communication for contacting the first plurality of suppliers.

13. The computing device of claim 9, wherein the card-acceptance-campaign strategy includes an order for contacting the first plurality of suppliers.

14. The computing device of claim 9, wherein the one or more processors are configured to output a report detailing the card-acceptance-campaign strategy for contacting the first plurality of suppliers.

15. The computing device of claim 9,
wherein the one or more interfaces are configured to receive a supplier response, the supplier response indicating acceptance or rejection of the commercial credit card program by the supplier, and wherein the one or more processors are configured to update the credit card acceptance information based on the supplier response.

16. A non-transitory computer-readable storage medium having stored thereon instructions that, when executed, cause a processor to:

determine, for each of a first plurality of suppliers and based on supplier data received from one or more customer computing devices and for the first plurality of suppliers, an average transaction amount for the transactions between the customer and the supplier, wherein the supplier data comprising transactional data including a total amount of transactions between a customer of a financial institution and a supplier to the customer over a period of time, and an industry type of the supplier;

determine, for each supplier of the first plurality of suppliers, a profile type based on the average transaction amount and the industry type of the supplier;

determine, for each supplier of the first plurality of suppliers and based on credit card acceptance information received from one or more databases and indicating acceptance or rejection of a commercial credit card program by a second plurality of suppliers, a supplier win rate associated with the profile type, wherein the supplier win rate is indicative of a rate of acceptance of the credit card program by a portion of the second plurality of suppliers associated with the profile type;

determine, for each supplier of the first plurality of suppliers, a spend win rate based on the respective profile type, wherein the spend win rate is indicative of a percentage of a spend amount by the third plurality of suppliers associated with the profile type converted to a payment amount associated with the commercial credit card program;

determine, for each supplier of the plurality of suppliers, a projected converted spend amount associated with the supplier based on the respective spend win rate and the total amount of the transactions between the customer and the respective supplier over the period of time;

determine, for the first plurality of suppliers, a customer spend amount expected to be converted to payment associated with the commercial credit card program by summing the plurality of projected converted spend amounts of the first plurality of suppliers;

determine a card-acceptance-campaign strategy based on at least one of the supplier win rates, the supplier spend rates, or the projected converted spend amounts for the first plurality of suppliers, wherein the card-acceptance-campaign strategy comprises a campaign strategy for converting the first plurality of suppliers to payment by the commercial credit card program, and wherein the card-acceptance-campaign strategy comprises prioritizing each supplier with respect to the first plurality of suppliers based on at least one of the supplier win rate, the spend win rate, or the projected converted spend amount; and output, to a graphical user interface, the card-acceptance campaign strategy, wherein the card-acceptance strategy includes the customer spend amount for the first plurality of suppliers.

* * * * *